US006209102B1

(12) United States Patent
Hoover

(10) Patent No.: US 6,209,102 B1
(45) Date of Patent: Mar. 27, 2001

(54) METHOD AND APPARATUS FOR SECURE ENTRY OF ACCESS CODES IN A COMPUTER ENVIRONMENT

(75) Inventor: Douglas Hoover, Mountain View, CA (US)

(73) Assignee: Arcot Systems, Inc., Santa Clara, CA (US)

( * ) Notice: Subject to any disclaimer, the term of this patent is extended or adjusted under 35 U.S.C. 154(b) by 0 days.

(21) Appl. No.: 09/249,043

(22) Filed: Feb. 12, 1999

(51) Int. Cl.[7] ..................................................... G06F 11/30
(52) U.S. Cl. ............................................ 713/200; 380/24
(58) Field of Search ..................................... 713/200, 201, 713/202; 380/24

(56) References Cited

U.S. PATENT DOCUMENTS

| | | | | |
|---|---|---|---|---|
| 5,276,314 | * | 1/1994 | Martino et al. ....................... | 235/380 |
| 5,428,349 | * | 6/1995 | Baker ................................. | 340/825.3 |
| 5,682,475 | * | 10/1997 | Johnson et al. ....................... | 713/202 |
| 5,821,933 | * | 10/1998 | Keller et al. .......................... | 345/348 |
| 5,919,091 | * | 7/1999 | Bell et al. ............................. | 463/25 |
| 6,016,504 | * | 1/2000 | Arnold et al. ........................ | 709/200 |

* cited by examiner

Primary Examiner—Robert W. Beausoliel, Jr.
Assistant Examiner—Rita A Ziemer
(74) Attorney, Agent, or Firm—Joseph Yang; Robert B. Beyers; Skadden, Arps et al.

(57) ABSTRACT

A user inputting his access code (e.g., PIN or password) into an computing environment to access a transaction is at risk of losing the access code to an attacker who has physical or electronic access to the computing environment. To minimize this risk, the access code can be entered via a plurality of user-selectable fields, each of which takes on a series of values, the initially displayed values of which are established in a random or otherwise unpredictable manner. The user then uses a mouse, keyboard, or other input device to increment each of the selectable fields until the access code is correctly entered. Because of the randomization of the initial state, an attacker tracking the locations or number of mouse clicks or other navigation actions can not determine the finally entered access code by, e.g., computing an offset from a known initial state.

23 Claims, 3 Drawing Sheets

Authenticate by Entering Your PIN

Enter your pin by clicking on the right entry in each column of the "bingo card".

Click "Show Pin" to see the whole PIN as entered so far. Click "Hide Pin" to hide it again.

Click Submit when you are sure you have entered the right PIN.

| 6 | 2 | 1 | 4 | 0 | 7 |
|---|---|---|---|---|---|
| 7 | 3 | 2 | 5 | 1 | 8 |
| 8 | 4 | 3 | 6 | 2 | 9 |
| 9 | 5 | 4 | 7 | 3 | 0 |
| 0 | 6 | 5 | 8 | 4 | 1 |
| 1 | 7 | 6 | 9 | 5 | 2 |
| 2 | 8 | 7 | 0 | 6 | 3 |
| 3 | 9 | 8 | 1 | 7 | 4 |
| 4 | 0 | 9 | 2 | 8 | 5 |
| 5 | 1 | 0 | 3 | 9 | 6 |

Current PIN: * * * * * *

Show PIN   Hide PIN

Submit

FIGURE 1

Authenticate by Entering Your PIN

Enter your pin by clicking on the right entry in each column of the "bingo card".

Click "Show Pin" to see the whole PIN as entered so far. Click "Hide Pin" to hide it again.

Click Submit when you are sure you have entered the right PIN.

| 6 | 2 | 1 | 4 | 0 | 7 |
|---|---|---|---|---|---|
| 7 | 3 | 2 | 5 | 1 | 8 |
| 8 | 4 | 3 | 6 | 2 | 9 |
| 9 | 5 | 4 | 7 | 3 | 0 |
| 0 | 6 | 5 | 8 | 4 | 1 |
| 1 | 7 | 6 | 9 | 5 | 2 |
| 2 | 8 | 7 | 0 | 6 | 3 |
| 3 | 9 | 8 | 1 | 7 | 4 |
| 4 | 0 | 9 | 2 | 8 | 5 |
| 5 | 1 | 0 | 3 | 9 | 6 |

Current PIN: * * * * * *

Show PIN | Hide PIN

Submit

FIGURE 2

Authenticate by Entering Your PIN

Reveal a digit by clicking on it and adjust it by clicking on the "+" or "-" buttons.

Click "Show Pin" to see the whole PIN as entered so far. Click "Hide Pin" to hide it again.

Click Submit when you are sure you have entered the right PIN.

Enter PIN:

| +2 | +2 | +2 | +2 | +2 | +2 |
|----|----|----|----|----|----|
| +1 | +1 | +1 | +1 | +1 | +1 |
| *  | *  | *  | *  | *  | *  |
| -1 | -1 | -1 | -1 | -1 | -1 |
| -2 | -2 | -2 | -2 | -2 | -2 |

[Show PIN] [Hide PIN] [Set PIN Random]

[Submit]

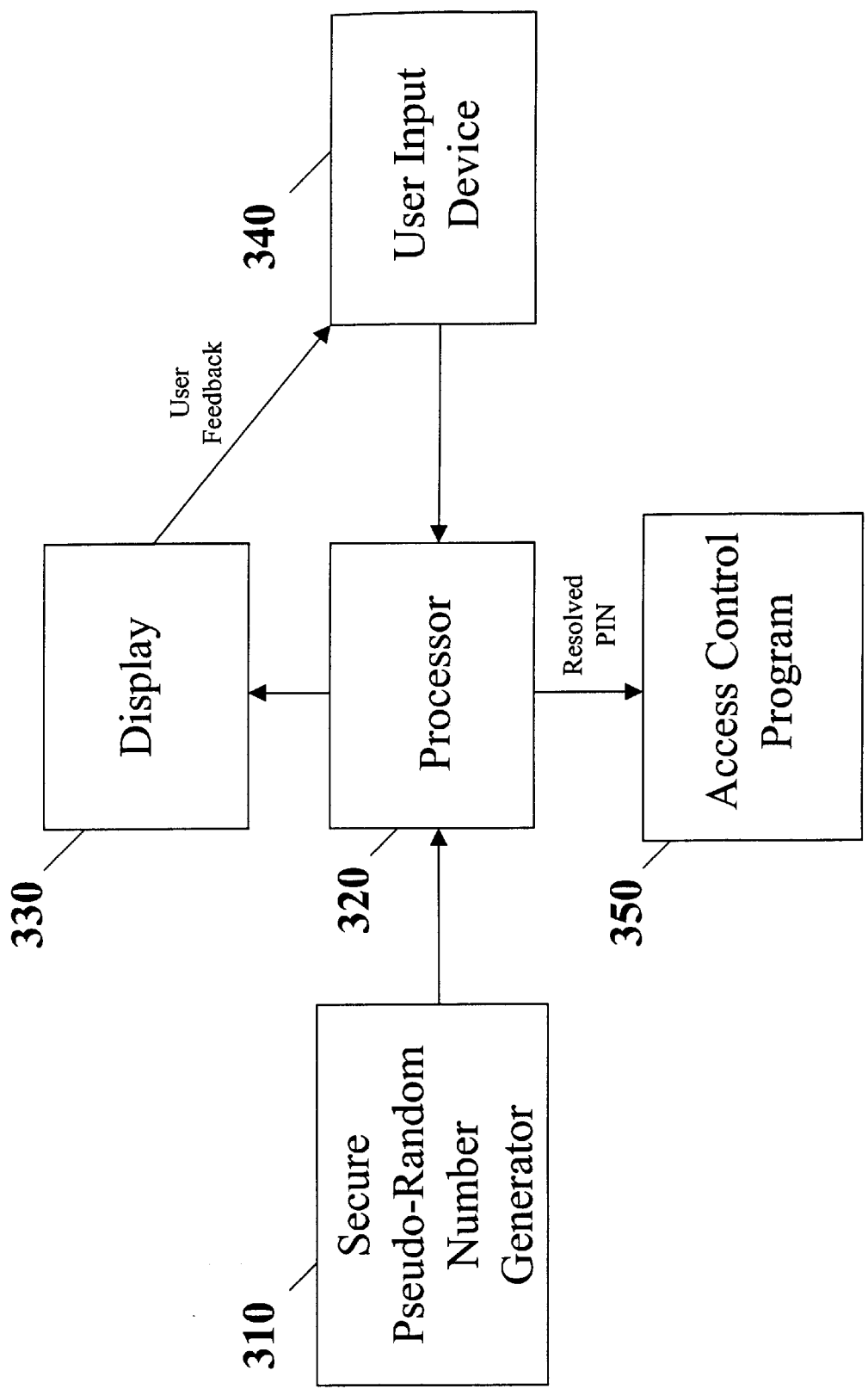

METHOD AND APPARATUS FOR SECURE ENTRY OF ACCESS CODES IN A COMPUTER ENVIRONMENT

BACKGROUND OF THE INVENTION

In a computer environment, access to a transaction (e.g., obtaining secret data kept on a computer, ordering a good or service via the computer, or accessing funds at an automatic teller machine (ATM) or point of sale (POS)) is usually protected by a personal identification number (PIN), a password, or other access code. When the user wishes to conduct the transaction, he types in his access code, and is allowed access (e.g., via an access control module) if the entered value correctly matches a stored value. A typical piece of data that is protected in such way is a user's private key, which can constitute a user's identity over the Internet or some other system that uses public key cryptography for user identification. If the attacker can get access to this private key, he can impersonate the user, read information intended to be private to the user, and conduct still other electronic transactions in the user's name.

An attacker might physically gain access to the user's computer physically, or do so electronically by loading a virus onto the user's computer. In either case, the attacker can then install a program that collects, and saves to a file, all the keystrokes that the user types on his keyboard. This file can be retrieved later, either via physical access to the machine or over a network, allowing the attacker to deduce the access code by examining the user's keystrokes. Besides keyboard entry, the access code could also be inputted by selecting, via a mouse, digits or letters (more generally, characters) from a predetermined pattern of user-selectable fields (e.g., a visual representation of a telephone, typewriter, or calculator keypad) displayed on a graphical user interface (GUI). In this scenario, the attacker could obtain information about the access code by capturing the locations (e.g., x- and y- coordinates) of mouse clicks and using them to deduce the characters indicated—since the locations of all possible characters on the interface occur in a known and fixed pattern (e.g., on a telephone-style keypad: Row 1=1, 2, 3; Row 2=4, 5, 6; Row 3=7, 8, 9; and Row 4=*, 0, #).

Even where the locations of all the alphanumeric characters are not known, an attacker could still deduce the access code when an initial state of the character fields is known. For example, consider simulating and displaying an in-line combination lock having an initial state of 0-0-0. The user then uses mouse clicks to turn the wheels (tumblers, rings, etc.) of the lock to input his access code. When the digits of the proper combination are all aligned in their proper positions, the lock "opens" (i.e., grants the user access to the desired transaction). An attacker knowing the initial state and the history of the mouse clicks could determine the access code by using the history as an offset from the initial state.

All of the foregoing shows that there is a need for protecting a user's PIN, password, or other access code, from disclosure to an attacker who, directly or indirectly, obtains the sequence of characters inputted by a user to gain access to a transaction.

BRIEF DESCRIPTION OF THE FIGURES

FIG. 1 illustrates one exemplary embodiment of the invention.

FIG. 2 illustrates another exemplary embodiment of the invention.

FIG. 3 illustrates an exemplary apparatus for secure entry of an access code.

DETAILED DESCRIPTION OF THE INVENTION

To prevent an attacker from using histories of the keyboard arrowing, mouse clicking, or other navigation or selection techniques to determine the access code, the present invention randomizes (or pseudo-randomizes or otherwise makes unpredictable) the initial state of the displayed user-selectable fields. Techniques for implementing randomizing logic or modules are well known to those skilled in the art and need not be described in detail here. As an example of displaying user selectable fields, if the display visually imitates a keypad, its numbers can be randomly scrambled after each access code entry (e.g., Row 1=4, 6, #; Row 2=2, 9, 8; Row 3=* , 1, 3; Row 4=0, 5, 7). Thus, an attacker who is unable to deduce the initial states of the user-selectable fields can not deduce the access code even if the attacker knows the history of the subsequent mouse clicks or other screen navigation actions. Effectively, the user's input appears to the attacker to be a random series of selections.

Alternatively, if the display depicts a combination lock, it is not necessary to scramble the characters (e.g., numbers) on the wheels, but only to start each wheel in an unpredictable position. That is, the numbers around the periphery of each wheel can still be ordered sequentially, as long as the wheels are initialized randomly. The wheels have the further advantage of being able to accommodate an arbitrarily large character set (e.g. all 26 letters of the alphabet and all 10 digits, if desired), whereas a scrambled keypad containing a large number of letters and digits might be inconvenient to use because of the difficulty in locating any desired letter or digit.

In yet another embodiment, shown in FIG. 1, a randomly initialized "bingo card" could be displayed, with the user entering the PIN by clicking on the correct character in each column of the bingo card. The current PIN could be displayable adjacent to the bingo card (FIG. 1) or the selected PIN characters could be highlighted on the bingo card, e.g. by changing the color or shading of the selected characters.

In still other embodiments, the user-selectable fields could be simply displayed as a series of character boxes, much like a crossword puzzle or fill-in-the blank game, with each field being initialized to an unpredictable alphanumeric character. For example, for a six-digit PIN, the system starts by displaying six random digits. To select his PIN, the user cursors through the digits. At each digit, he hits the up or down arrow key (to increment the digit by +1 or −1) an appropriate number of times until the desired digit appears.

Alternatively, as shown in FIG. 2, each particular, initially random PIN digit could be adjusted to the correct value by clicking on the corresponding "+" or "−" buttons.

Alternatively, two rows of digits could be used. One row could display an initially random PIN digit sequence. The user would input in an adjacent row an offset digit sequence such that the correct PIN digit sequence was formed when the offset digit sequence row was added to the initially random PIN digit sequence row. The resulting correct PIN digit sequence could be displayed adjacent to the other two rows.

In any of the above embodiments, an attacker might be able to examine what is displayed on the screen as the user inputs the access code, either through software or by physically looking over the user's shoulder. To defeat this attack, a particular user selectable field could be made effectively unreadable by darkening it so that its value is not visible except when the mouse or cursor is over that field. Similarly, one or more fields could be made unreadable by replacing fields, other than the one being instantaneously inputted, with asterisks (e.g., see FIG. 1 or FIG. 2) or other noninformational characters, before or after they are selected or entered on the screen. In these ways, the attacker's opportunities to read the characters of the access code as they are entered on the screen are minimized.

FIG. 3 shows a schematic of an exemplary apparatus for secure entry of an access code for secure access to an electronic service, including a hardware or software based secure pseudo-random number generator 310 providing an initially randomized input to processor 320 for display to a user on display 330. Based on the display, the user provides feedback (in the form of an entered access code) via input device 340, which is passed back through processor 320 to access control program 350. Note that a non-visual "display" 330 is also possible, e.g. feedback via audio headphones or other output devices. The feedback to the user, whether by visual display or other means, should be harder for an attacker to intercept than the user input.

A wide variety of techniques (e.g. software or hard-wired instructions running on processor 320) can be used for implementing the foregoing user-selectable fields in various environments (e.g. accepting them via input device 340 and displaying them via display 330) including, without limitation, the following:

(a) In an Internet environment, the user-selectable fields could be implemented (i) using Javascript on a web page to send the PIN to a common gateway interface (CGI) script or active server page, (ii) using a Java applet on a web page to send the PIN to a CGI script or active server page, (iii) using a plug-in with a GUI on a web page to send the PIN to a CGI script or active server page, (iv) using a specialized network application with a GUI to send results by a network connection to a server application, or (v) using a specialized network application with command line input.

(b) In a stand-alone computing environment, the user-selectable fields could be implemented (i) by GUI, (ii) by command line entry using the offsets to an initial value method, or (iii) by use of a machine logon method.

(c) In a network PC environment or a personal digital assistant environment, the user-selectable fields could be implemented using the methods just described for an internet environment or a stand-alone computing environment.

(d) In an ATM or POS environment, the user-selectable fields could be implemented directly on processor 320 via an application specific integrated circuit (ASIC), programmable logic array (PLA), or microcode and displayed on a touch screen or keypad.

These and many other techniques for implementing and displaying the user selectable fields are well known to those skilled in the art, and need not be described in greater detail here. Similarly, a wide variety of input devices 340 could be used for inputting the user-selectable fields including, without limitation, a keyboard, a mouse, a touch pad, a think screen, or other pointing devices. Hardware and program logic code for implementing and controlling these devices are well known to those skilled in the art and need not be described in detail here. Finally, although the various embodiments have disclosed alphanumeric characters, the displayed fields are not strictly limited to alphanumeric characters, but could also include mathematical symbols or discrete elements of ideographic languages such as Japanese or Chinese. It should therefore be understood that references to "alphanumeric" or "character" include all these and still other linguistic or symbolic elements with which an access code can be represented.

Those skilled in the art will readily appreciate that all the foregoing (and many other) techniques known to those skilled in the art for creating and displaying visual fields, for inputting the access code, and for the format of the access code, can be used in conjunction with the present invention. It is therefore intended that the scope of the invention be not limited to the particular embodiments disclosed herein, but rather to the full breadth of the claims appended hereto.

What is claimed is:

1. A method for secure entry of an access code for secure access to an electronic service, comprising the steps of:
 (a) displaying, via a graphical user interface, a plurality of locations for receiving a user-inputted access code;
 (b) for each displayed location:
  (i) scrambling a plurality of fields associated with said location and selectable by a user to specify an element of said access code, said scrambling occurring independently of that for at least another of said locations;
  (ii) displaying, via a graphical user interface, said plurality of scrambled user-selectable fields for said location;
  (iii) accepting, from said user, a selection chosen from among said fields for said location, said selection occurring independently of that for at least another of said locations;
 (c) granting, to said user, access to a service if said accepted plurality of selections correctly correspond to said access code.

2. The method of claim 1 where said selectable fields include a plurality of alphanumeric characters.

3. The method of claim 1 where said user selections are accepted from said user via a pointing device.

4. The method of claim 3 where said pointing device is a touch screen.

5. The method of claim 3 where said pointing device is a mouse.

6. The method of claim 1 where said user selections are accepted from said user via a keyboard.

7. The method of claim 1 where said user-selectable fields include an incrementing arrow in said graphical user interface.

8. The method of claim 1 where said step of displaying said selectable fields include displaying a visual form of a keypad containing said fields for viewing by said user.

9. The method of claim 1 where said step of displaying said selectable fields includes displaying a visual form of a plurality of rotatable wheels for viewing by said user.

10. The method of claim 1 where said step of displaying said selectable fields includes displaying a representation of a bingo card for viewing by said user.

11. The method of claim 1 where said step of displaying said selectable fields includes displaying at least one of said fields as unreadable except when said one of said fields is being selected by said user.

12. The method of claim 11 where said step of displaying said field as unreadable includes displaying a darkened field.

13. The method of claim 11 where said step of displaying said field as unreadable includes displaying a non-informing character.

14. The method of claim 1 where said step of scrambling said selectable fields is performed after accepting a previously inputted user selection of said fields.

15. An apparatus for secure entry of an access code for secure access to an electronic service, comprising:
  (a) a graphical user interface for displaying a plurality of locations for receiving a user-inputted access code;
  (b) a scrambling module for initializing a plurality of fields associated with each said location, said fields being selectable by a user to specify an element of said access code, said scrambling for said location occurring independently of that for at least another of said locations;
  (c) an output device configured to display, to said user, said plurality of scrambled user-selectable fields for each of said locations;
  (d) an input device configured to accept, from said user, a selection chosen from among said fields for each of said locations, each said selection for each said location occurring independently of that for at least another of said locations; and
  (e) an access control module configured to grant, to said user, access to an electronic service if said plurality of selections correctly correspond to said access code.

16. The apparatus of claim 15 wherein said service includes an automatic teller machine transaction.

17. The apparatus of claim 15 wherein said output device is configured as a graphical user interface.

18. The apparatus of claim 17 wherein said graphical user interface is an Internet browser.

19. The apparatus of claim 15 wherein said output device is an audio device.

20. A computer-readable medium containing logic instructions for secure entry of an access code for access to an electronic service, said logic instructions comprising:
  (a) code configured to display a plurality of locations for receiving a user-inputted access code;
  (b) scrambling program code configured to initialize a plurality of fields associated with each said location, said fields being selectable by a user to specify an element of said access code, said scrambling for said location occurring independently of that for at least another of said locations;
  (c) display program code configured to present, to said user, said plurality of scrambled user-selectable fields for each of said locations;
  (d) input program code configured to accept, from said user, a selection chosen from among said fields for each of said locations, each said selection for each said location occurring independently of that for at least another of said locations; and
  (e) access control program code configured to grant, to said user, access to a transaction protected by said code if said accepted plurality of selections correspond to said access code.

21. The method of claim 1 where said selectable fields include a plurality of linguistic elements.

22. The apparatus of claim 15 where said selectable fields include a plurality of linguistic elements.

23. The computer-readable medium of claim 20 where said selectable fields include a plurality of linguistic elements.

* * * * *